United States Patent [19]

Speer

[11] Patent Number: 4,917,745
[45] Date of Patent: Apr. 17, 1990

[54] FABRIC REPAIR PROCESS

[76] Inventor: Lawrence L. Speer, 16678 Chibiabos Trail, Doylestown, Ohio

[21] Appl. No.: 247,684

[22] Filed: Sep. 22, 1988

[51] Int. Cl.⁴ .............................................. B32B 35/00
[52] U.S. Cl. .................................... 156/94; 206/582; 427/140; 427/206; 428/90; 428/63
[58] Field of Search ........................ 156/94; 206/582; 427/140, 206; 428/90, 63

[56] References Cited

U.S. PATENT DOCUMENTS 3,975,558  8/1976  Speer ...................................... 156/94
4,058,423 11/1977  Bascom et al. ........................ 156/98
4,659,525  4/1987  Speer ................................ 156/98 X Primary Examiner—Robert A. Dawson
Assistant Examiner—James Engel
Attorney, Agent, or Firm—Oldham & Oldham Co.

[57] ABSTRACT

A process for repairing damaged fabrics, and kits which contain the components required to practice such process are disclosed, in which the process involves placing a backing fabric beneath the damaged area and thereafter depositing a powdered thermoplastic resin, followed by a mixture of a thermoplastic resin and Flockkfibers thereon. The laminate assembly thus obtained is then heated until resin securely binds the Flockkfibers and the backing fabric within the damaged area. The kit taught includes containers of the Flockkfibers, resins, and mixing implements, and may optionally include some or all of backing fabric, release paper, fabric protector, instructions, and related items.

2 Claims, 1 Drawing Sheet

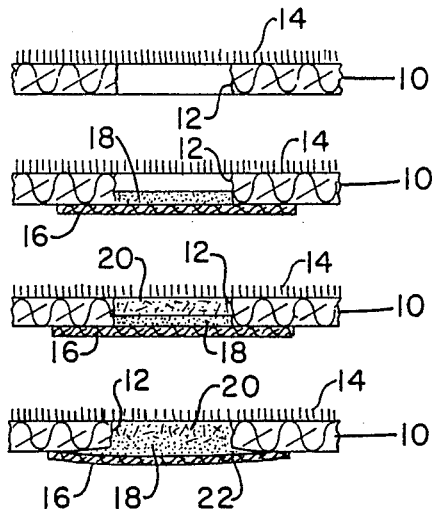
FIG.-1A
FIG.-1B
FIG.-1C
FIG.-1D
FIG.-2
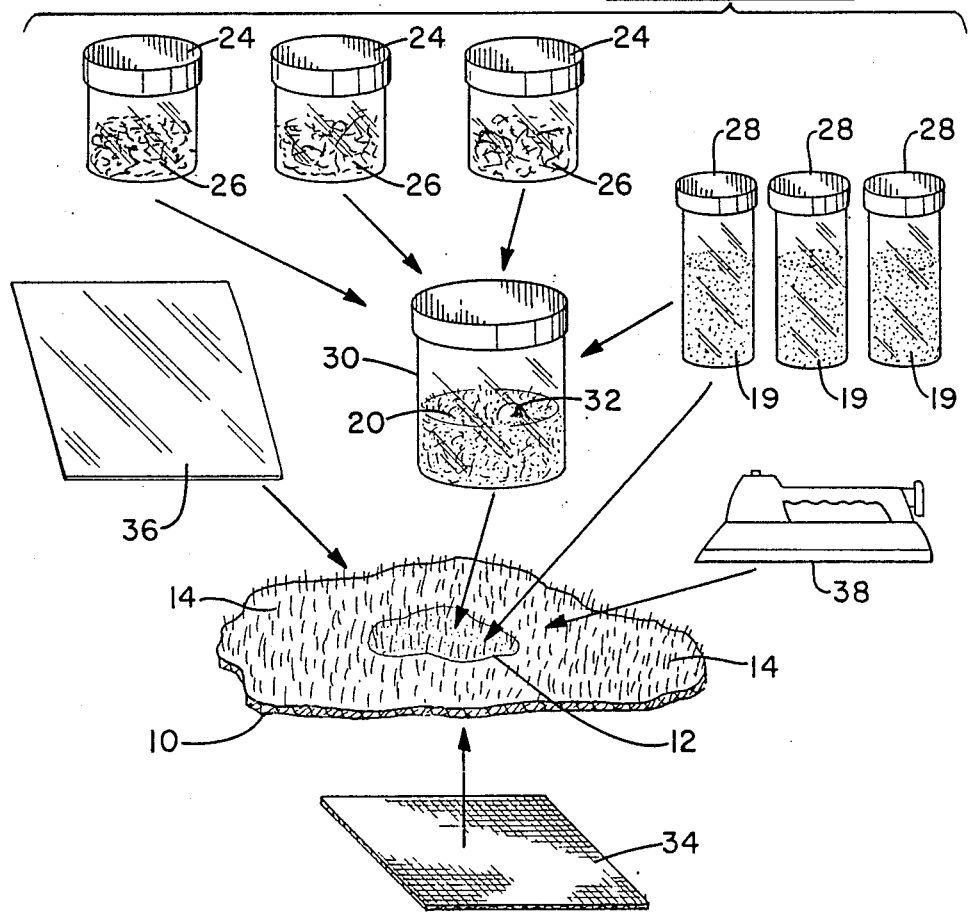

FABRIC REPAIR PROCESS

TECHNICAL FIELD

This invention relates to a process for repairing damaged fabrics, and to kits containing components for carrying out such process. More particularly, this invention relates to a fabric repair process able to produce patch areas with nap which closely resemble the undamaged fabric surrounding the repaired area. Specifically, this invention relates to a process involving the adhesion of thermoplastic material containing flockkfibers to backing fabric disposed beneath the damaged area, thereby producing a repair substantially indistinguishable from the surrounding area.

BACKGROUND OF THE INVENTION

The attempted repair of damaged fabric materials used in upholstery, clothing, carpeting, and other articles is commonly undertaken in order to restore the repaired materials to their original appearance and function. While repairs performed with a needle and thread, with or without patching fabric, can restore the serviceability of damaged fabrics, the repairs are usually objectionably visible. In the case of certain woven fabrics, particularly fabrics made with coarser weaves, the damaged area can also be rewoven with surplus threads taken from other areas of the article to be repaired. While repairs made in this fashion are normally, substantially undetectable, reweaving is time-consuming, as well as expensive, since it must be undertaken by individuals possessing a high degree of skill. At least for those reasons, the method is impractical in many cases.

Another repair system commonly used relies upon fabric patches associated with heat activatable adhesives. Such patches are placed either on, or beneath the damaged area, and subsequently attached by exposure to heat, for example, to a hot iron. While repairs thus made effectively restore a fabric's utility, it is oftentimes difficult to obtain a patch having a color resembling that of the fabric to be repaired, and the method fails to produce a repaired article in which the surface of the repaired area, as well as the surrounding area, lie in the same plane. Such surface irregularity, and differences in color result in a "second-hand" appearance, and are objectionable from that standpoint.

DISCLOSURE OF THE INVENTION

In view of the foregoing, therefore, it is a first aspect of the invention to provide a process for repairing damaged fabrics which produces a substantially unnoticable repair.

A second aspect of the invention is to produce a repaired area whose surface is relatively level with that of the surrounding, undamaged fabric.

A further aspect of the invention is the provision of a process which produces a repair patch whose color is substantially identical with that of the surrounding, undamaged fabric.

Another aspect of the invention is to produce a repair patch having a napped, textured appearance, closely matching the surrounding, undamaged fabric.

An additional aspect of the invention is to produce a process for repairing fabrics which restores the fabrics to a serviceable condition, and to their former appearance.

Still another aspect of the invention is to provide a process for repairing fabrics, particularly "blue jean" fabrics, which is both quick and easy to carry out, even by inexperienced individuals.

A further aspect of the invention is to furnish the necessary components for carrying out the repair process in a relatively inexpensive, convenient kit form.

The preceding and other aspects of the invention are provided by a repair kit comprising packaged components which include:

flockkfibers;
powdered thermoplastic resins, and
mixing means.

The preceding and other aspects of the invention are also provided by a process for repairing damaged fabric comprising preparing a repair assembly by the sequential steps of:

covering the underneath surface of the fabric's damaged area with a backing fabric;

placing a first layer of a powdered thermoplastic resin in the damaged area, on said backing cloth;

placing at least one additional layer of a mixture comprising flockkfibers and a thermoplastic resin on top of said first layer, and thereafter heating the repair assembly thus formed thereby securing said backing fabric and the flockkfibers to said damaged fabric.

BRIEF DESCRIPTION OF THE DRAWINGS

The invention will be better understood when reference is had to the following drawings, in which like parts are indicated by like numbers, and wherein:

FIG. 1, A through D, show cross-sectional views of a piece of damaged fabric, and the sequence of steps for repairing it by the method of the invention.

FIG. 2 shows various components of a kit designed to permit the process of the invention to be carried out.

DETAILED DESCRIPTION OF THE INVENTION

FIG. 1A shows a cross-sectional view of a portion of fabric 10 having a damage hole 12 therein. In the Figure, the fabric is shown with a napped surface 14. During the repair process, any dirt in the vicinity of the damaged area may first be cleaned with a conventional fabric cleaner, and if desired the damage hole 12 may be trimmed to eliminate any loose fibers or peripherally damaged portions. As shown in FIG. 1B a piece of backing fabric 16, cut slightly larger than the damage hole 12, is inserted and spread out evenly under the damaged hole, if necessary, by working the backing fabric under the hole with a spatula, or similar tool. A quantity of a powdered thermoplastic resin 18 is then placed in the damage hole 12 on the exposed surface of the backing fabric 16, and tamped into a smooth layer thereon to form an underlayer. Next, as illustrated in FIG. 1C, a mixture 20 of a thermoplastic resin combined with flockkfibers is deposited in the damage hole as an overlayer in an amount sufficient to make the mixture substantially level with the surface of the damaged fabric 10. Thereafter, heat is applied to the repair assembly described in the preceding, i.e., the lamination of the backing fabric 16, the thermoplastic resin underlayer 18, and the overlayer mixture 20 of Flockkfibers with a thermoplastic resin. In FIG. 1D, a finished repair is shown in which a portion of the plastic resin underlayer 18 has penetrated the area 22 between the backing fabric 16 and the damaged fabric 10, providing a strong bond between the two, and the flockkfibers have similarly been anchored within the patched area by resin, producing a durable repair.

The flockkfibers useful for purposes of the invention are short fibers, typically having a length of from about 0.01 to 0.04 inch, and commonly having a denier of from about 1.5 to 3. The length of the fibers, and the denier, may be substantially uniform, or the fibers may comprise a mixture of different lengths and denier. The fibers will normally be selected to match the material being repaired, and may include material, such as cotton, acrylics, polyesters, and the like.

The thermoplastic resins advantageously are ones having a melting range below the temperature at which injury to the fabric to be repaired would occur if the fabric were exposed to such heat, and it has been found preferable to employ thermoplastic resins having a melting range of from about 100° C. to 150° C. The nature of the theremoplastic resins may be varied, but certain resins have been found to be particularly suited to the purposes of the invention. Specifically, it has been found that in preparing resin-flockkfiber mixtures, the use of polymide or polyester resins, or mixtures of them, are of particular advantage in preparing a napped patch without an undesirably glossy surface. In an especially preferred embodiment, it has been determined that when the fabric being repaired is to be subsequently subjected to dry cleaning, it is preferable that a thermoplastic polymide resin, be used to prepare the flockmixture, while thermoplastic polyester resins are normally selected for such mixtures when the damaged fabric is to be cleaned with soap and water, as for instance, in a washing machine. Examples of suitable polymide and polyester materials are those sold under the trademarks "PLATAMID" and "PLATHERM", respectively, by Atochem, Inc. of Glenn Rock, N.J.

While polyamide and polyester resins, or their mixtures, may also be employed in preparing the underlayer 18, particular advantages have been found in the use of plastisol resins, either clear or colored, for the purpose. Plastisol resins are polyvinylchloride, PVC, homopolymers, sometimes referred to as "dispersion" resins, which typically have a paricle size of from about 0.3 to 0.9 microns, and a glass transition temperature of from about 80° C. to 85° C. An example of suitable plastisol resins are those sold by the B.F. Goodrich Company under the trademark "Geon". Among the advantages of using plastisol resins as the underlayer is that such resins improve the bond to the backing fabric, as well as increase the flexibility of the repaired area.

The backing cloth may be selected from any of a variety of commonly available materials, for example, cotton, nylon, acrylics and the like, and if desired, it may be coated with a heat sensitive adhesive finish, activatable by the application of heat, thereby helping the resin to attach the backing cloth in the repair area.

FIG. 2 shows various ones of the components which can be used to repair damaged fabrics according to the process of the invention, and which may be included in a kit designed to facilitate practice of the repair process.

In the Figure, a number of flockfiber containers 24 are shown, each usually containing a different color of flockfibers 26. Thermoplastic resin containers 28 are also shown, with suitable thermoplastic resins 19 contained therein. As shown by the arrows associated with the described containers, suitable ones of the contained materials are combined in a mixture container 30 to form the thermoplastic resin-flockfiber mixture 20. In FIG. 2, container 30 is shown with an agitator ball 32 inserted therein to facilitate the mixing operation. As previously described, a backing fabric 34 is placed beneath the damaged area, and a thermoplastic resin 18, and the thermoplastic resin flockfiber mixture 20 are inserted in the damage hole 12, as indicated by the associated arrows. In the Figure, a release paper 36 is thereafter placed over the top of the repair assembly, and a heating source, for instance, a flat iron 38 is applied to the release paper for the period of time necessary to incorporate thermoplastic resin 18, and the mixture of resin with the Flockkfibers 20, into an integral patch with the damaged fabric 10 and the backing material 34.

If too great an amount of thermoplastic resin is combined with the flokfibers to form the mixture 20:, an objectionably shiny, hard patch, one too easily observed, will result. Consequently, it has been found that on a weight basis, the amount of thermoplastic resin present should constitute about 15% to 40% of the mixture; however, a preferred range is about 20% to 30%, since a selection within that range produces a particularly unnoticeable patched area having a highly flocked surface.

The mixture may be made by placing the thermoplastic resin and flockfibers in any suitable container and mixing the two components together with a spatula, stirring rod, or otherwise, to the point at which a substantially uniform mixture has been obtained. It has been discovered however, that when the components of the mixture are placed in a closed container, such as the container 30 of FIG. 2, together with an agitator ball 32, which may be any relatively hard ball such as a marble, ball bearing, or other similar object, and the container is shaken vigorously, the flockfibers acquire a particularly uniform and tenaciously adhering coating of the thermoplastic resin, possibly as the result of static electricity formed by the mixing technique which bonds the resin and flockparticles together. In any event, the ball mixing technique is especially suited to forming repairs according to the process of the invention. In the mixing operation, different colored Flockkfibers will be combined in whatever relative amounts are required to achieve a color blend closely approximating that of the damaged fabric. Desirably, the kits will contain a sufficient variety of different colors of flockfibers to allow a broad range of colored fabrics to be repaired.

If desired the release paper, typically coated with a silicone material to assist in the release process, may be embossed to help impart a somewhat irregular surface to the patched area, which breaks up light reflection, and assists in masking the repairs existence. Alternatively, an ordinary piece of cloth may be substituted for the release paper. In either case, after sufficient heat has been applied to bind the resin, flock, fabric, and backing material together, the repaired area is allowed to cool before the release paper or cloth is removed. If after completion of the repair as described the surface of the patched area has contracted, a common occurance, and is lower than the surrounding, undamaged surface of the fabric, additional amounts of the thermoplastic resin-flockfiber mixture may be applied, and the heating step repeated until a substantially level surface across the entire area has been achieved.

In some cases, particularly in the case of damaged fabric with a pronounced nap, it may be desirable to provide a subsequent "napping" step in which additional flockfibers are sprinkled over the repaired area, and the area is subsequently "dusted" with an additional amount of thermoplastic resin. Thereafter, heat may be indirectly applied to the area, as by means of radiant heat, or a hair dryer, to provide a particularly pleasing, unnoticable, and highly napped surface.

If desired, after the repair has been completed, the area can be treated with a fabric protector, which may also be included in the repair kit. Such protectors are well known in the art, typically consisting of a clear coating of urethane, lacquer, latex, or the like.

While in accordance with the patent statutes, a preferred embodiment and thus mode has been presented, the scope of the invention is not limited thereto, but rather is measured by the scope of the attached claims.

What is claimed is:

1. A process for repairing damaged fabric comprising preparing a repair assembly by the sequential steps of:

covering the underneath surface of the damaged fabric's damaged area with a backing fabric;

placing a first layer of a thermoplastic resin in the damaged area, on said backing cloth;

placing at least one additional layer of a mixture comprising flockfibers and a thermoplastic resin on top of said first layer, and thereafter heating the repair assembly thus formed thereby securing said backing fabric and the flockfibers to said damaged fabric; and wherein said mixture of flockfibers in said resin is prepared by placing the mixture components in a closed container with an agitator ball and shaking the container.

2. A process according to claim 1 wherein said resin comprises from about 15 percent to about 40 percent, by weight, of said mixture.

* * * * *